United States Patent [19]
Levert et al.

[11] Patent Number: 5,808,902
[45] Date of Patent: Sep. 15, 1998

[54] POWER QUALITY TRANSDUCER FOR USE WITH SUPERVISORY CONTROL SYSTEMS

[75] Inventors: George Levert, Atlanta, Ga.; William Stuntz, Milpitas, Calif.

[73] Assignee: Basic Measuring Instruments, Santa Clara, Calif.

[21] Appl. No.: 652,156

[22] Filed: May 23, 1996

[51] Int. Cl.$^6$ ................................ G06F 17/18; H04B 3/46
[52] U.S. Cl. .................... 364/492; 364/483; 364/574; 324/111; 324/142; 340/657; 340/664
[58] Field of Search ..................... 364/480–483, 364/492, 570, 572, 574, 700; 324/76.11, 142, 111, 500; 330/250, 278, 279, 127, 129; 340/286.01, 310.01, 531, 533, 538, 540, 657, 664; 322/17, 22–25; 333/14; 361/78–79; 381/104, 106

[56] References Cited

U.S. PATENT DOCUMENTS

| | | | |
|---|---|---|---|
| Re. 31,750 | 11/1984 | Morrow | 364/508 |
| 3,278,685 | 10/1966 | Harper | 179/1 |
| 3,529,140 | 9/1970 | Doering | 235/151.31 |
| 3,532,905 | 10/1970 | Zijta et al. | 307/265 |
| 3,753,089 | 8/1973 | Gunn et al. | 324/529 |
| 3,753,133 | 8/1973 | Shumate, Jr. | 327/96 |
| 3,758,763 | 9/1973 | Nohara et al | 364/487 |
| 3,927,309 | 12/1975 | Fujiwara et al. | 364/487 |
| 3,958,132 | 5/1976 | Livesay | 327/15 |
| 3,968,115 | 7/1976 | Prugh | 564/203 |
| 3,986,116 | 10/1976 | Smith et al. | 324/102 |
| 4,064,488 | 12/1977 | Chapman | 340/146.2 |

(List continued on next page.)

OTHER PUBLICATIONS

McGranaghan, "South Africa Sets the Standard", from Power Quality Assurance Magazine, pp. 20–25, Dec. 1997.

New Products, "High Performance test equipment from Hewlett Packard—HP 54620C Color 16 Channel Logic Analyzer and HP 54600B 2 Channel 100 MHz Oscilloscope" from Active Electronics, p. 4, Apr. 1997.

New Products, "Accuracy, reliability, quality all from Hewlett Packard—HP 54645A 2–Channel 100 MHz Deep Memory and MegaZoom Oscilloscope; HP 54645D Dual Channel 100 MHz 200 MSa/s Mixed Signal Oscilloscope", Active Electronics, p. 15, Apr. 1997.

Tektronix, "TDS 300 Series Digital Real–Time Scopes", Test and Measurement, p. 19, Apr. 1997.

(List continued on next page.)

*Primary Examiner*—Emanuel Todd Voeltz
*Assistant Examiner*—Cuong H. Nguyen
*Attorney, Agent, or Firm*—Haverstock & Owens LLP

[57] ABSTRACT

A method and apparatus for detecting power quality or disturbance events, such as voltage swells, sags or impulses, in power signals at remote locations of a power distribution system and for conveying information relating to the power disturbances to a central location. Voltage and/or current signals in electric power lines are monitored and converted to low level analog signals. The low level signals are processed by analog processing circuits or are digitally sampled and processed by digital processing circuits to detect power disturbances. Each power disturbance is characterized according to multiple parameters. The characterization information is encoded into a single signal. This is done by assigning a subset of a range of possible values of the signal to represent a parameter and then assigning a value within each subset of the range to represent another parameter. A sampling system located at the central location periodically samples the encoded signal at each remote location to collect information relating to power disturbances occurring throughout the power distribution system. Because sampling occurs only periodically, the encoded signal maintains its value for an amount of time after a power disturbance is detected that is long enough to ensure that it will be sampled. Then, the encoded signal returns to the level representative of an absence of a power disturbance until the next power disturbance occurs.

35 Claims, 3 Drawing Sheets

U.S. PATENT DOCUMENTS

| | | | |
|---|---|---|---|
| 4,132,947 | 1/1979 | Weischedel et al. | 324/76.18 |
| 4,160,175 | 7/1979 | Trout | 327/72 |
| 4,187,461 | 2/1980 | Cox | 324/102 |
| 4,219,860 | 8/1980 | DePuy | 361/94 |
| 4,293,921 | 10/1981 | Smith, Jr. | 364/726.03 |
| 4,303,984 | 12/1981 | Houvig | 364/571.07 |
| 4,313,509 | 2/1982 | Engels | 177/50 |
| 4,328,552 | 5/1982 | Stovall | 364/554 |
| 4,342,965 | 8/1982 | Baldwin | 327/37 |
| 4,418,392 | 11/1983 | Hata | 364/571.07 |
| 4,419,619 | 12/1983 | Jindrick et al. | 323/257 |
| 4,423,408 | 12/1983 | Place | 341/167 |
| 4,446,498 | 5/1984 | Stich | 361/87 |
| 4,466,071 | 8/1984 | Russell, Jr. | 364/492 |
| 4,510,571 | 4/1985 | Dagostino et al. | 364/487 |
| 4,519,083 | 5/1985 | Hanson | 375/338 |
| 4,521,865 | 6/1985 | Winkler et al. | 364/719 |
| 4,589,074 | 5/1986 | Thomas et al. | 364/483 |
| 4,592,002 | 5/1986 | Bozarth, Jr. et al. | 364/571.03 |
| 4,611,304 | 9/1986 | Butenko et al. | 364/571.07 |
| 4,612,617 | 9/1986 | Laplace, Jr. et al. | 364/483 |
| 4,612,617 | 9/1986 | Laplace, Jr. et al. | 364/483 |
| 4,615,009 | 9/1986 | Battocletti et al. | 364/483 |
| 4,633,422 | 12/1986 | Brauer | 364/571.07 |
| 4,641,090 | 2/1987 | Danby | 324/107 |
| 4,642,563 | 2/1987 | McEachern et al. | 324/111 |
| 4,652,876 | 3/1987 | Darilek | 340/854.9 |
| 4,672,555 | 6/1987 | Hart et al. | 364/483 |
| 4,690,150 | 9/1987 | Mayo, Jr. | 348/29 |
| 4,694,055 | 9/1987 | Itoh et al. | 526/201 |
| 4,694,402 | 9/1987 | McEachern et al. | 364/487 |
| 4,754,407 | 6/1988 | Nolan | 364/481 |
| 4,758,962 | 7/1988 | Fernandes | 364/483 |
| 4,777,605 | 10/1988 | Pilkington | 364/484 |
| 4,783,748 | 11/1988 | Swarztrauber et al. | 364/483 |
| 4,794,369 | 12/1988 | Haferd | 341/166 |
| 4,799,005 | 1/1989 | Fernandes | 324/127 |
| 4,811,264 | 3/1989 | Hershberger | 364/726.03 |
| 4,814,696 | 3/1989 | Kern et al. | 324/142 |
| 4,818,947 | 4/1989 | Zucker et al. | 324/520 |
| 4,833,618 | 5/1989 | Verma et al. | 364/483 |
| 4,845,649 | 7/1989 | Eckardt et al. | 364/571.02 |
| 4,847,892 | 7/1989 | Shelley | 379/93.09 |
| 4,850,010 | 7/1989 | Stanbury et al. | 379/106.06 |
| 4,858,160 | 8/1989 | Strid et al. | 364/571.01 |
| 4,858,615 | 8/1989 | Meinema | 128/912 |
| 4,862,493 | 8/1989 | Venkataraman et al. | 379/106.04 |
| 4,864,842 | 9/1989 | Regimand | 73/1.88 |
| 4,866,761 | 9/1989 | Thornborough et al. | 379/106.04 |
| 4,868,476 | 9/1989 | Respaut | 318/632 |
| 4,868,704 | 9/1989 | Cavero | 364/180 |
| 4,872,195 | 10/1989 | Leonard | 379/40 |
| 4,873,655 | 10/1989 | Kondraske | 364/553 |
| 4,879,510 | 11/1989 | Itoh | 324/144 |
| 4,884,021 | 11/1989 | Hammond et al. | 324/142 |
| 4,912,468 | 3/1990 | Rust | 341/119 |
| 4,924,412 | 5/1990 | Leydier | 364/483 |
| 4,931,725 | 6/1990 | Hutt et al. | 324/142 |
| 4,933,869 | 6/1990 | Gareis et al. | 364/483 |
| 4,937,520 | 6/1990 | Arseneau et al. | 324/74 |
| 4,974,255 | 11/1990 | Defay et al. | 379/106 |
| 4,977,513 | 12/1990 | LaPalme | 364/483 |
| 4,980,634 | 12/1990 | Mallinson | 324/142 |
| 4,992,725 | 2/1991 | Komatsu et al. | 324/142 |
| 4,995,109 | 2/1991 | Arizumi et al. | 379/107 |
| 4,996,703 | 2/1991 | Gray | 379/40 |
| 5,010,568 | 4/1991 | Merriam et al. | 379/106.07 |
| 5,014,229 | 5/1991 | McEachern et al. | 364/571.04 |
| 5,018,193 | 5/1991 | DeArkland | 379/145 |
| 5,046,084 | 9/1991 | Barret et al. | 379/102.06 |
| 5,059,896 | 10/1991 | Germer et al. | 324/142 |
| 5,061,916 | 10/1991 | French et al. | 341/522 |
| 5,089,979 | 2/1992 | McEachern et al. | 364/571.04 |
| 5,180,971 | 1/1993 | Montijo | 324/121 R |
| 5,184,066 | 2/1993 | McEachern et al. | 324/73.1 |
| 5,212,441 | 5/1993 | McEachern et al. | 324/142 |
| 5,216,621 | 6/1993 | Dickens | 364/483 |
| 5,224,054 | 6/1993 | Wallis | 364/483 |
| 5,270,637 | 12/1993 | McEachern et al. | 324/102 |
| 5,272,439 | 12/1993 | Mashikian et al. | 324/520 |
| 5,298,854 | 3/1994 | McEachern et al. | 324/142 |
| 5,298,855 | 3/1994 | McEachern et al. | 324/142 |
| 5,298,856 | 3/1994 | McEachern et al. | 324/142 |
| 5,298,885 | 3/1994 | McEachern et al. | 340/660 |
| 5,298,888 | 3/1994 | McEachern et al. | 340/660 |
| 5,300,924 | 4/1994 | McEachern et al. | 340/660 |
| 5,302,890 | 4/1994 | McEachern et al. | 324/142 |
| 5,307,009 | 4/1994 | McEachern et al. | 324/142 |
| 5,347,464 | 9/1994 | McEachern et al. | 364/483 |
| 5,408,523 | 4/1995 | McEachern et al. | 379/106.03 |
| 5,446,650 | 8/1995 | Overhage et al. | 364/487 |
| 5,471,401 | 11/1995 | Nicholson et al. | 364/483 |
| 5,481,468 | 1/1996 | McEachern et al. | 364/481 |
| 5,502,374 | 3/1996 | Cota | 324/127 |
| 5,510,700 | 4/1996 | Pomatto | 324/76.83 |

OTHER PUBLICATIONS

"Product Features: Instrumentation & Test Equipment: Current Probes, Current Probe Adapter", Power Quality Assurance Magazine, p. 68, Mar. 1997.

CPM Technology, "ACE 2000 Power Analysis Made Smarter", from IR Industrial Resources, Mar. 1997.

Power Measurement, "Power Measurement for Power Information Solutions" from Power Quality Assurance Magazine, Dec. 1997.

Ross Engineering Corp. "Power Quality Measurement & Recording—for Above 600V DC, 10MHz", from Power Quality Assurnace Magazine, p. 75, Nov. 1997.

Rochester Instrument Systems, "Power Quality Analysis from RiS", from Power Quality Assurance, p. 77, Nov. 1997.

IEEE, "IEEE Recommended Practice for Establishing Transformer Capability When Supplying Nonsinusoidal Load Currents", ANSI/IEEE C57.110–1986, Apr. 1, 1988.

DAMAR (Data Acquistion, Monitoring, and Reporting), Sygnus Control, Inc., 510 East 41st Street, Paterson, NJ 07504.

IEEE, "IEEE Guide for Harmonic Control and Reactive Compensation of Static Power Converters", ANSI/IEEE STD 519–1981, Apr. 27, 1981.

POWER QUALITY TRANSDUCER FOR USE WITH SUPERVISORY CONTROL SYSTEMS

FIELD OF THE INVENTION

This invention relates to instruments for measuring electric power parameters at a first location and transmitting the parameters to a second location. More particularly, the invention relates to instruments for measuring parameters of an electric power disturbance at a first location, encoding the parameters into a signal, and transmitting the parameters to a second location by periodically sampling the encoded signal.

BACKGROUND OF THE INVENTION

Instruments for measuring and recording electric power parameters, such as power flow parameters and power disturbance parameters, are well known in the art. Such instruments typically connect to electric power voltage and current signals, then either compare those signals to thresholds that have been programmed for various types of well-known power disturbances, such as harmonics, voltage swells and sags, imbalance, power failures, waveshape faults, impulses, frequency variations, flicker and high frequency noise, or mathematically process those signals to extract power flow parameters. Such well-known power disturbances have well-known parameters, such as maximum or minimum amplitude, polarity, duration, characteristic frequency, energy content, and so forth. When a triggering event occurs, such as a power disturbance or an elapsed interval of time, these well-known instruments generate an alarm or report. The alarm or report may consist of an indicator on the instrument itself, or a printed or displayed report at the instrument, or an alarm or report at some remote location.

An example of such a prior-art measuring instrument is the Modem 9020 PQNode, manufactured by Basic Measuring Instruments of Santa Clara, Calif. Such prior art measuring instruments, or subsystems thereof, are also disclosed by Smith in U.S. Pat. 3,813,667 by McEachern et al. in U.S. Pat. Nos. 4,642,563 and 4,694,402, McEachern and Nicholson in U.S. Pat. No. 5,300,924, and McEachern and Piehl in U.S. Pat. No. 5,270,637.

Transducers for converting one level and type of analog signal to another level or type of analog signal are also well-known in the art. For electric power measurements, these transducers typically connect to three-phase voltage and/or three-phase current signals, and produce an analog signal that is proportional to the measured quantity of interest. For example, an electric power measurement transducer might be connected to a three-phase voltage signal and to produce a ±1 milliamp analog signal proportional to the mean RMS (root-mean-square) voltage on the three phases, or a ±1 milliamp analog signal proportional to the watts, volt-amps, or some other calculated or measured quantity.

An example of such prior-art electric power transducers is the Exceltronic series manufactured by the Scientific Columbus Company of Columbus, Ohio.

The output analog signal of these electric power transducers is commonly connected to data acquisition system, such as a Supervisory Control and Data Acquisition (SCADA) system. A SCADA system typically consists of a master station, a communication network, remote terminal units (RTU's), and a number of transducers and control points. The transducers and control points are directly coupled to voltages, currents, and activating switches, such as those voltages, currents, and activating switches found at an electric utility substation. The RTU's convert and prepare the signals from the transducers, putting them in a form that can be communicated to the master station through the communication network. Such a SCADA system allows one operator, located at the master station, to inspect and control a geographically dispersed system.

Often, such a SCADA system is equipped with alarms that can be set to trip when reported analog signals rise above or fall below pre-set thresholds. Many SCADA systems scan the analog inputs located at the associated RTU's at a rate between one scan per second and one scan per ten seconds.

It is a well-known disadvantage of prior-art power quality measuring instruments that a dedicated communication channel, such as a telephone line and modem, is required to communicate events from a remote monitoring site. SCADA communication systems are often already installed at sites where it would be desirable to monitor the electric power quality by monitoring disturbances in the power signals.

However, it is a well-known disadvantage of prior-art electronic power transducers, coupled to SCADA systems, that common power disturbance events may occur too quickly to be detected by the scanning rate of the SCADA system. For example, the SCADA system may scan each of its analog inputs once per second, but a typical power system oscillatory transient may last less than a millisecond.

It is an object of this invention to provide a power quality transducer that can operate successfully with well-established SCADA systems, despite the wide disparity between the duration of a typical power disturbance event and the length of time between scans by such a SCADA system.

Further objects and advantages will become apparent from a consideration of the ensuing description and accompanying drawings.

SUMMARY OF THE INVENTION

The invention is a method and apparatus for detecting power quality or disturbance events in power line signals at one or more remote locations of a power distribution system and for conveying information relating to the power disturbance events to a central location via a signal having an encoded value.

The invention monitors voltage and/or current signals in electric power lines. The signals are converted to low level analog voltage and/or current signals for processing. The low level signals may be processed by analog processing circuits to detect power disturbances or the low level signals may be digitally sampled and processed by digital processing circuits to detect the power disturbances. A power disturbance may be a harmonic, a voltage swell, a voltage sag, a power failure, a waveshape fault, an imbalance, an impulse, a frequency variation, a flicker, a burst or excessive noise and may be characterized by parameters including maximum or minimum amplitude, polarity, duration, characteristic frequency, or energy content. The processing circuits preferably characterize each power disturbance event according to multiple parameters of the disturbance.

The invention encodes the characterization information into a single encoded value. This is done by assigning a subset of a range of possible values to represent a parameter of the power disturbance event and then by assigning a value within each subset of the range to represent another parameter. For example, if the range of possible values is ±5 volts, then values between 0 and 3 volts could be assigned to events having a duration of less than a predetermined amount of time, values between 3 and 5 volts could be assigned to events having a duration longer than the predetermined amount of time that have a positive polarity, values between 0 and −5 volts could be assigned to events having a duration longer than the predetermined amount of time that have a negative polarity and 0.0 volts could be assigned to represent the absence of an event. Then, each subset is divided so that each value within the subset represents an extreme amplitude of the event. Thus, information relating to the duration of the event, the polarity of the event and the extreme amplitude of the event is represented by the single encoded value.

A sampling system located at the central location periodically samples the encoded signal at each of the remote locations to collect information relating to the power disturbance events occurring throughout the power distribution system. Because the sampling occurs only periodically, the encoded signal maintains its value after a power disturbance event is detected for a time period that is long enough to ensure that it will be sampled. Then, the encoded signal returns to the level representative of an absence of a power disturbance event until the next power disturbance event occurs.

DETAILED DESCRIPTION OF THE PREFERRED EMBODIMENT

Figure 1:
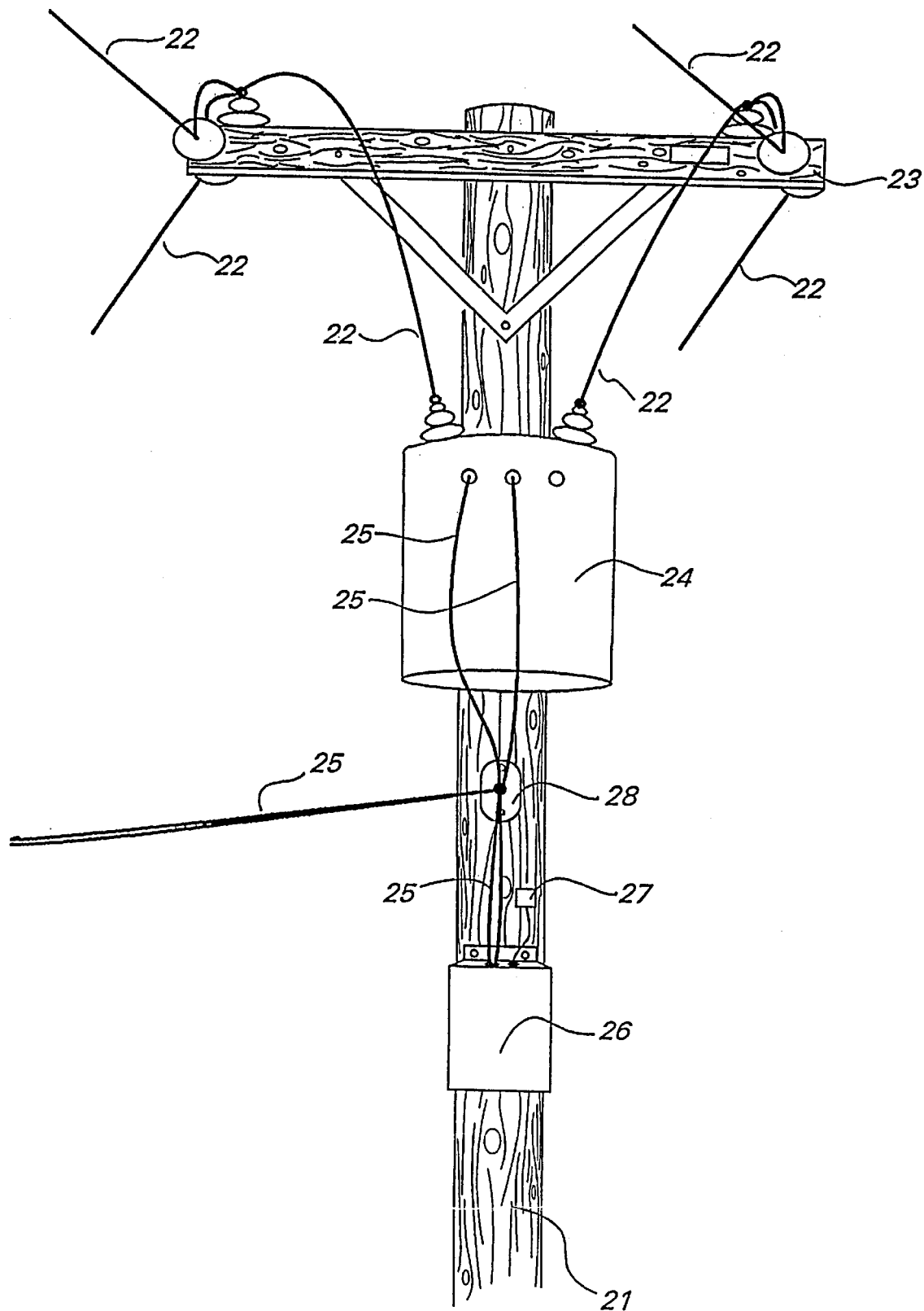
FIG. 1 is a drawing showing the context in which the present invention may be utilized.

Turning first to FIG. 1, we see the context in which the present invention, which may be enclosed in a steel container 26, is utilized. The present invention is a transducer that converts parameters of power quality or disturbance events that take place on electric power lines 22, 25 into analog signals that are compatible with existing SCADA systems. Such compatible analog signals may be connected, for example, through a terminal block 27 to an existing SCADA system. The precise method of connection is not relevant to the present invention and has been omitted for clarity.

The present invention is capable of sensing power disturbance events on high-voltage or medium-voltage electric power lines 22 when such voltages are reduced by a transformer 24. The present invention is also capable of sensing power disturbance events on end-use-voltage electric power lines 25. Such power lines are commonly found on power poles 21 equipped with crossbars 23 and appropriate mechanical strain reliefs 28.

Figure 2:
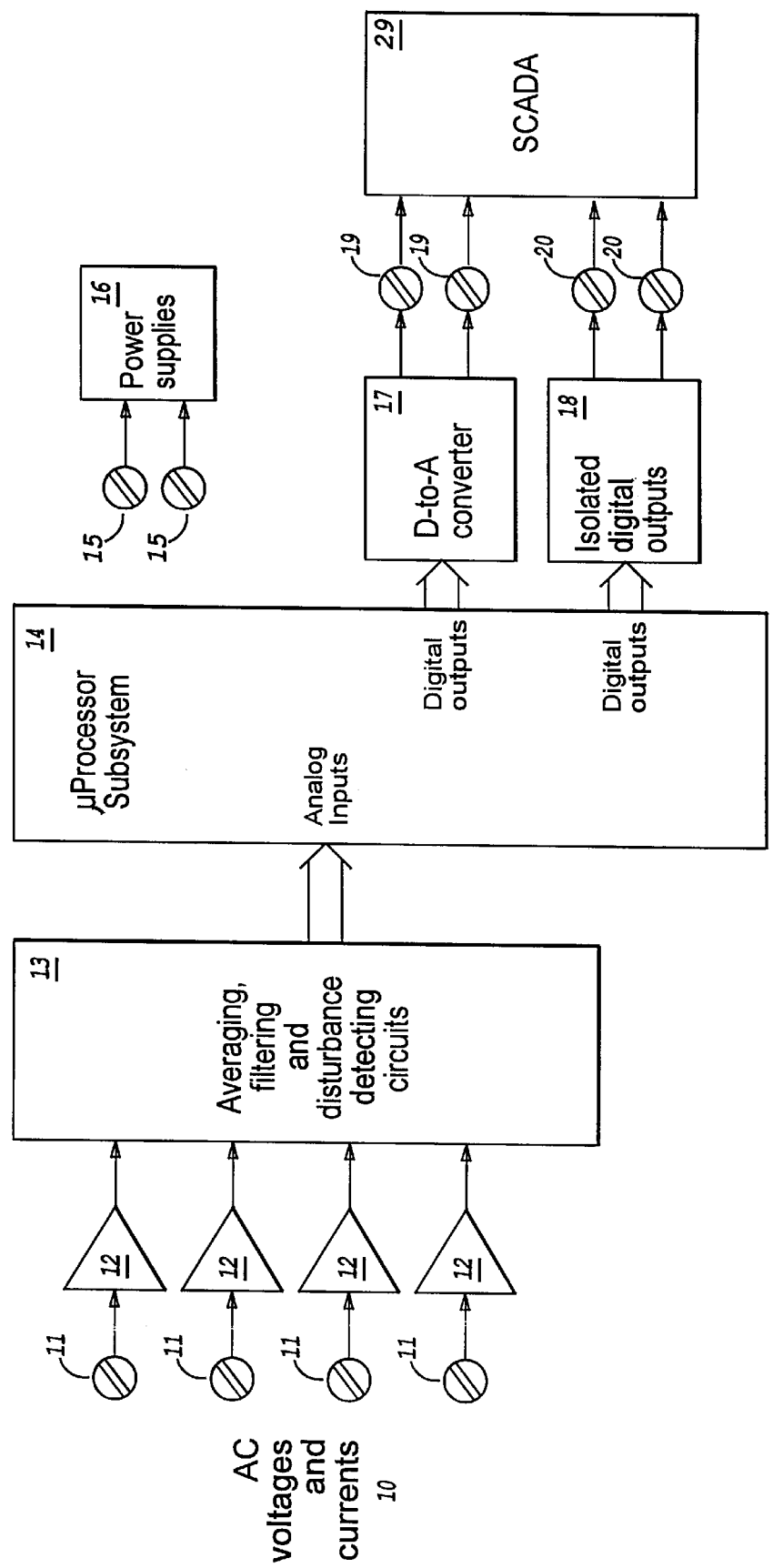
FIG. 2 is a block diagram of the present invention.

Turning now to FIG. 2, we see a block diagram of the present invention. AC (alternating current) voltages and currents 10, either coupled directly from the power system to the present invention or coupled through such well-known devices as current transformers and potential transformers, are brought to terminals 11 on the present invention, and are converted by well-known attenuators, burden resistors, and differential amplifiers 12 to amplitudes appropriate for electronic systems. Well-known averaging, filtering and disturbance detecting circuits 13 may examine the AC voltages and currents for parameters such as maximum or minimum amplitude, polarity, duration, characteristic frequency, or energy content, of various power disturbances well known in the art, such as harmonics, voltage swells and sags, imbalance, power failures, waveshape faults, impulses, frequency variations, flicker, and high frequency noise. Alternately, the responsibility for performing such analysis may take place in a microprocessor subsystem 14, which may be any well-known microprocessor subsystem incorporating analog-to-digital conversion, such as those based on the 68HC11 family of microprocessors by Motorola Inc., of Schaumberg, Ill. Such a microprocessor subsystem 14, as is well known in the art, may perform analysis and threshold detection for determining whether a power disturbance event has occurred, and if one has occurred, its critical parameters. Such a microprocessor subsystem 14 may also perform timing functions, including determining an elapsed time.

Adjacent to the microprocessor subsystem 14 is a power supply block 16 which derives its input power from a pair of terminals 15. The details of this power supply block 16 are not critical to the present invention, and any well known power supply system for delivering, for example 5 volts, plus 15 volts, and minus 15 volts, may be employed.

Continuing to examine FIG. 2, we see that the microprocessor subsystem 14 can control a digital-to-analog (D-to-A) converter 17. This D-to-A converter 17, the output of which may be any standard range of voltages, such as ±5 volts, or currents, such as 5 to 20 milliamps or ±1 milliamp, is coupled to an analog input of a SCADA system 29 through its terminals 19.

We see that the microprocessor subsystem 14 can also communicate to a SCADA system 29 through isolated digital outputs 18, which may be 2 Form C relay contacts or any other well-known digital interface. These isolated digital outputs are coupled to the SCADA system 29 through terminals 20. The function of these isolated digital outputs 18 are not critical to the present invention, and may take any form well known in the art.

Figure 3:
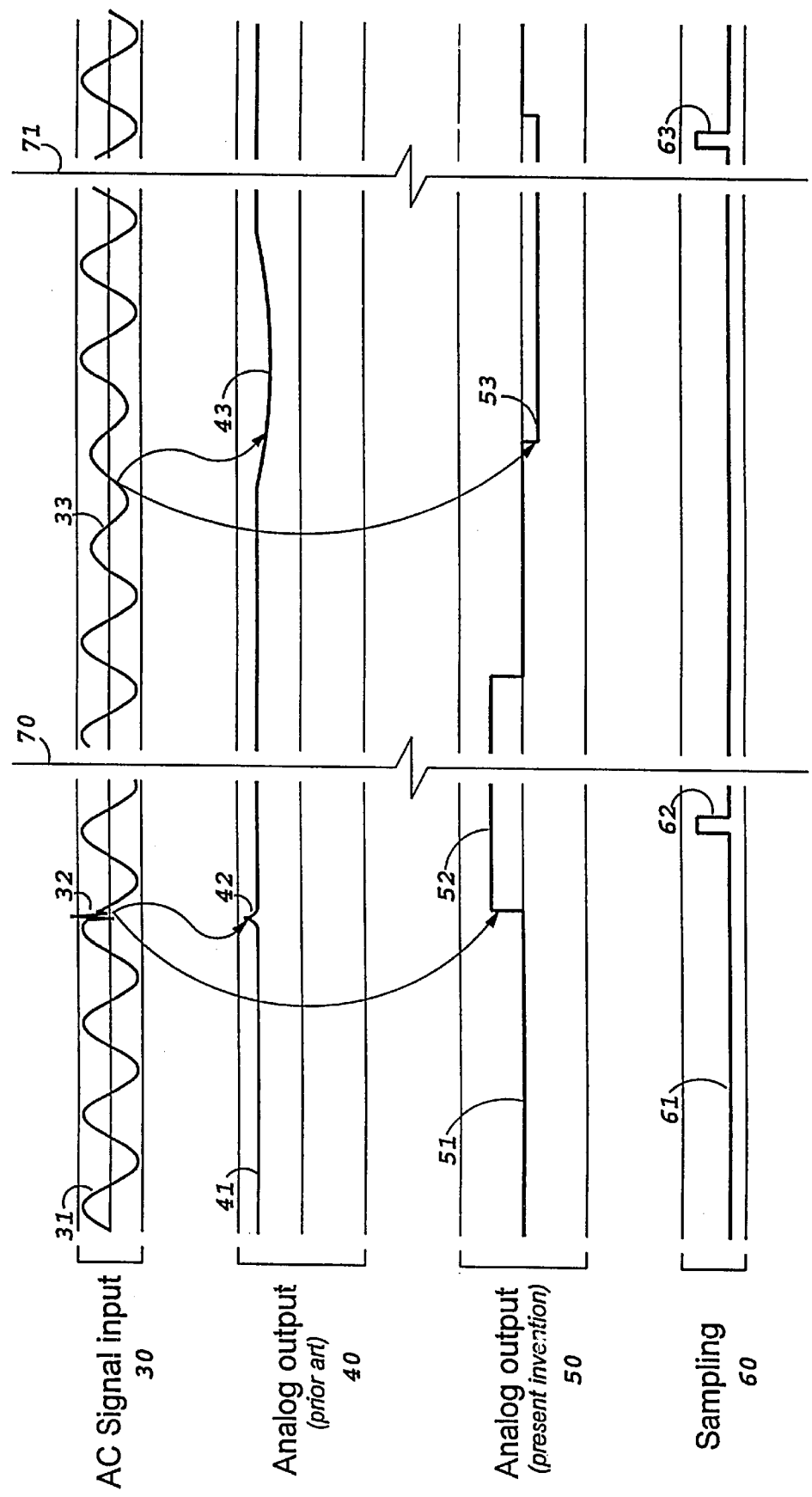
FIG. 3 is a series of waveforms which contrast the present invention with prior art.

Turning now to FIG. 3, we see four oscillographic waveforms related to the operation of the present invention. As is traditional in waveform drawings, time advances on the horizontal axis as we move from the left of FIG. 3 to the right of FIG. 3. Further examination of FIG. 3 reveals to gaps in the displayed time, each gap of indeterminate duration, as indicated by gap lines 70, 71.

The AC Signal input 30 corresponds to one typical AC voltage found on the terminals 11 of FIG. 2. As will become apparent, this AC Signal input is one of many possible voltage or current waveforms of a single-phase or a three-phase power system that could be found on terminals 11 of FIG. 2. Continuing to examine the AC Signal input 30 of FIG. 3, we see that its waveform trace 31 is disrupted by power disturbance events at two points: by an oscillatory transient burst 32, and by a two-cycle sag 33.

Turning our attention to the corresponding prior-art Analog output 40, we see an output voltage trace 41 of a typical prior-art voltage transducer. The power disturbance events 32, 33 result in brief excursions in the prior-art output voltage trace 42, 43.

Now examining the bottom of FIG. 3, we see a Sampling 60 signal that indicates the instants in the time during which the SCADA system is sampling the analog output of the present transducer. The trace 61 shows two brief and widely separated pulses 62, 63 when the SCADA system is sampling the output of the present transducer during the SCADA systems scanning procedure. At all other times, the SCADA system is scanning other transducers or performing other functions, and is unaware of the analog output of the transducer. Scanning pulses 62 and 63 may last for less than 1 millisecond in a typical SCADA system and the gap between scanning intervals may be between 1 and 10 seconds in a typical SCADA system.

Consequently, with the prior art Analog output 40, the SCADA system is unaware that power disturbance events 32 and 33 have occurred.

Now we turn our attention to the Analog output 50 of the present invention. This Analog output 50 is the signal that is available on the terminal pair 19 for the D-to-A converter 17 of FIG. 2. When the microprocessor subsystem 14 detects power disturbance events 32,33, it uses its D-to-A converter to place an analog code 52, 53 on its Analog output 50. Such an analog code 52, 53 may indicate both the type and severity of the power disturbance event.

In the preferred embodiment, positive analog outputs of two-thirds full-scale or less encode the amplitude of transient events, such as transients caused by switching power factor correction capacitors; positive analog outputs greater than two-thirds of full scale encode the amplitude of RMS voltage swells; and negative analog outputs encode voltage sags. Within the noted range, the amplitude of the analog output encodes the amplitude of the power disturbance event. This correspondence between input event and output voltage is shown in the following table (as is well known to those familiar with electric power measurements, the abbreviation p.u. in the table stands for per-unit measurements):

| Input Event | Output voltage |
|---|---|
| RMS voltage swell > 1.3 p.u. | +5.00 V |
| RMS voltage swell > 1.2 p.u. | +4.25 V |
| RMS voltage swell > 1.1 p.u. | +3.50 V |
| Transient, peak voltage > 2.0 p.u. | +3.30 V |
| Transient, peak voltage > 1.5 p.u. | +2.47 V |
| Transient, peak voltage > 1.0 p.u. | +1.65 V |
| Transient, peak voltage > 0.5 p.u. | +0.82 V |
| No event | +0.00 V |
| RMS voltage sag, < 0.8 p.u. | −0.50 V |
| RMS voltage sag < 0.4 p.u. | −2.75 V |
| RMS voltage sag, 0.0 p.u. | −5.00 V |

Further, as is shown in FIG. 3, the microprocessor subsystem 14 maintains the analog output 50 level for at least one SCADA system sampling interval, regardless of the short duration of the triggering event 32, 33 or the long duration between SCADA-system sampling pulses 62, ensuring that a properly encoded analog signal is passed through the SCADA system to the master station.

It will be noted that the preferred embodiment permits the transmission of only one disturbance event type and amplitude for each sampling interval. In the preferred embodiment, the microprocessor subsystem 14 can queue and defer presentation of power disturbance events if a plurality of such events occur during one sampling interval.

By properly choosing master station alarm levels applied by SCADA master station to this analog output 50, the operator can be readily notified of a wide variety of power disturbance events.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiments chosen for illustration without departing from the spirit and scope of the invention.

Specifically, it will be apparent to one of ordinary skill in the art that the device of the present invention could be implemented in several different ways and the apparatus disclosed above is only illustrative of the preferred embodiment of the invention and is in no way a limitation. For example, other power disturbance events or parameters may be encoded. The microprocessor subsystem 14 may be configured to accommodate various different SCADA system sampling rates. Specific analog levels may encode multiple events. Users who are particularly interested in a specific type of power disturbance event, such as voltage swells or current harmonics, may allocate a greater proportion of the output analog range to that particular type of event in order to enhance the resolution of measurement. Successive analog levels may be used to encode further information about the power disturbance events. Local parameters, such as temperature and state of switches and the like, may be encoded in the analog level. Various other modifications may be made to the preferred embodiment without departing from the spirit and scope of the invention as defined by the appended claims.

What is claimed is:

1. An apparatus for sensing a disturbance in an electric power signal and for forming a signal representative of the disturbance, the apparatus comprising:
   a. means for sensing a first signal;
   b. means for detecting coupled to the means for sensing for detecting a disturbance in the first signal;
   c. means for forming coupled to the means for detecting for forming a second signal having an amplitude representative of a first parameter of the disturbance wherein the second signal remains representative of the first parameter for a predetermined period after a disturbance is detected; and
   d. means for remotely sampling the second signal during the predetermined period.

2. The apparatus according to claim 1 wherein the second signal becomes representative of an absence of a disturbance after the predetermined period.

3. The apparatus according to claim 1 wherein the means for remotely sampling periodically samples the second signal according to a predetermined sampling interval.

4. The apparatus according to claim 3 wherein the predetermined sampling interval is shorter than the predetermined period.

5. The apparatus according to claim 4 wherein the amplitude of the second signal is also representative of a second parameter of the disturbance.

6. The apparatus according to claim 4 wherein further comprising means for adjusting the amplitude of the second signal in response to the occurrence of an additional disturbance detected between samples.

7. An apparatus for sensing a disturbance in an electric power signal and for forming a signal representative of the disturbance, the apparatus comprising:
   a. means for sensing a first signal;
   b. means for detecting coupled to the means for sensing for detecting a disturbance in the first signal; and
   c. means for forming coupled to the means for detecting for forming a second signal having an amplitude representative of a first parameter of the disturbance and representative of a second parameter of the disturbance.

8. The apparatus according to claim 7 wherein the first signal is an electric power signal.

9. The apparatus according to claim 8 wherein the first parameter of the disturbance is representative of a duration of the disturbance.

10. The apparatus according to claim 8 wherein the second parameter of the disturbance is representative of an amplitude of the disturbance.

11. The apparatus according to claim 8 wherein the amplitude of the second signal is also representative of the absence of any disturbance.

12. The apparatus according to claim 11 wherein the amplitude of the second signal is representative of the first parameter of the disturbance and representative of the second parameter of the disturbance for a predetermined period after the disturbance is detected and wherein the amplitude of the second signal is representative of the absence of any disturbance after the predetermined period.

13. The apparatus according to claim 12 further comprising means for sampling the amplitude of the second signal having a sample period wherein the predetermined period is at least as long as the sample period.

14. The apparatus according to claim 13 further comprising means for adjusting the amplitude of the second signal in response to the occurrence of an additional disturbance detected between samples.

15. The apparatus according to claim 13 further comprising means for queuing a value representative of a parameter of an additional disturbance detected between samples.

16. An apparatus for sensing a disturbance in an electric power signal and for forming a signal representative of the disturbance, the apparatus comprising:

a. means for sensing a first signal;

b. means for detecting coupled to the means for sensing for detecting a disturbance in the first signal; and c. means for forming coupled to the means for detecting for forming a second signal representative of a parameter of the disturbance wherein the second signal remains representative of the parameter of the disturbance for predetermined period and becomes representative of an absence of a disturbance after the predetermined period.

17. The apparatus according to claim 16 wherein the second signal is representative of one or more additional parameters of the disturbance.

18. The apparatus according to claim 16 further comprising means for sampling the level of the second signal having a sample period wherein the predetermined period is at least as long as the sample period.

19. The apparatus according to claim 18 wherein the means for forming further comprises means for adjusting a level of the second signal in response to the occurrence of an additional disturbance detected between samples.

20. The apparatus according to claim 18 wherein the means for forming further comprises means for queuing a value representative of a parameter of an additional disturbance detected between samples.

21. A method for collecting data representative of disturbances in an electric power signal comprising the steps of:

a. sensing an electric power signal;

b. detecting a disturbance in the electric power signal;

c. characterizing the disturbance according to a first parameter of the disturbance and according to a second parameter of the disturbance;

d. generating an encoded signal having an amplitude that is representative of the first parameter and representative of the second parameter.

22. The method according to claim 21 wherein the step of characterizing the disturbance comprises:

a. measuring the first parameter of the disturbance;

b. assigning a range of amplitudes to the encoded signal wherein the assigned range corresponds to the first parameter;

c. measuring the second parameter of the disturbance; and d. selecting an amplitude within the assigned range wherein the selected amplitude corresponds to the second parameter.

23. The method according to claim 22 wherein the first parameter is representative of a duration of the disturbance and wherein the second parameter is representative of an extreme amplitude of the disturbance.

24. The method according to claim 22 wherein the first parameter is representative of a type of the disturbance and wherein the second parameter is representative of a severity of the disturbance.

25. The method according to claim 22 wherein the encoded signal is also representative of an absence of a disturbance.

26. The method according to claim 25 wherein the encoded signal remains representative of the first parameter of the disturbance and representative of the second parameter of the disturbance for a predetermined amount of time before returning to a level representative of the absence of a disturbance.

27. The method according to claim 26 further comprising the step of periodically sampling the encoded signal for generating a series of sampled values.

28. The method according to claim 27 further comprising the steps of:

a. transmitting the sampled values to a remote location; and b. storing the sampled values at the remote location.

29. An apparatus for measuring and recording electric power parameters, the apparatus comprising:

a. a receiving circuit coupled to receive electric power signals from an electric power line;

b. a first converting circuit coupled to the receiving circuit for converting the electric power signals to low level analog signals;

c. a second converting circuit coupled to the first converting circuit for converting the low level analog signals into a first series of digital values;

d. an analyzing circuit coupled to the second converting circuit for analyzing the first series of digital values for determining whether a power disturbance has occurred and, if a power disturbance has occurred, determining a first parameter and a second parameter of the power disturbance and forming an encoded signal wherein the encoded signal is representative of the first parameter and the second parameter and, if no power disturbance has occurred, the encoded signal is representative of the absence of an occurrence of a power disturbance; and e. a sensing circuit for periodically sensing the encoded signal.

30. The apparatus according to claim 29 wherein the encoded signal remains representative of the first parameter for a predetermined period after a disturbance is detected.

31. The apparatus according to claim 29 wherein the first parameter is representative of an extreme amplitude of the disturbance and the second parameter is representative of a duration of the disturbance.

32. The apparatus according to claim 29 wherein the encoded signal is a binary signal.

33. The apparatus according to claim 29 wherein the encoded signal is an analog signal.

34. The apparatus according to claim 29 wherein the encoded signal is converted from a binary signal into an analog signal.

35. The apparatus according to claim 29 wherein the encoded signal is sensed from a remote location.

* * * * *